(12) United States Patent  
DeBast et al.

(10) Patent No.: US 8,646,358 B2  
(45) Date of Patent: Feb. 11, 2014

(54) SAFETY BICYCLE PEDAL, PARTICULARLY FOR MOUNTAIN BIKES

(75) Inventors: Jean-Francois DeBast, Vaulx-Mileu (FR); Hervé Servignat, Succieu (FR)

(73) Assignee: Time Sport International (FR)

( * ) Notice: Subject to any disclaimer, the term of this patent is extended or adjusted under 35 U.S.C. 154(b) by 317 days.

(21) Appl. No.: 12/833,618

(22) Filed: Jul. 9, 2010

(65) Prior Publication Data

US 2011/0005348 A1     Jan. 13, 2011

(30) Foreign Application Priority Data

Jul. 10, 2009 (FR) ...................................... 09 03419

(51) Int. Cl.
*B62M 3/00* (2006.01)
(52) U.S. Cl.
USPC ........................................................ 74/594.6
(58) Field of Classification Search
USPC .................. 74/594.4–594.7; 482/57; 36/131; 280/259–261; 267/36.1, 41
See application file for complete search history.

(56) References Cited

U.S. PATENT DOCUMENTS

| | | | |
|---|---|---|---|
| 5,667,206 A * | 9/1997 | Chang | 267/148 |
| 5,765,450 A | 6/1998 | Kruger et al. | |
| 6,282,984 B1 * | 9/2001 | Chen | 74/594.6 |
| 6,477,917 B1 * | 11/2002 | Peyre et al. | 74/594.6 |
| 2009/0031850 A1 * | 2/2009 | Hillairet et al. | 74/594.6 |

FOREIGN PATENT DOCUMENTS

| | | |
|---|---|---|
| EP | 1063161 A1 | 12/2000 |
| EP | 2020373 A1 | 2/2009 |
| FR | 2746761 A1 | 10/1997 |
| FR | 2931791 A1 | 12/2009 |
| WO | WO-2008129145 A1 | 10/2008 |

\* cited by examiner

*Primary Examiner* — Alan B Waits  
*Assistant Examiner* — Richard Urbanski  
(74) *Attorney, Agent, or Firm* — The Belles Group, P.C.

(57) ABSTRACT

Safety bicycle pedal, particularly for mountain bikes, comprising a body (1) mounted such that it can rotate about a pedal spindle, and which has, on at least one face of the pedal, a front clip arrangement (5*a*) and a rear clip arrangement, at least one of the front or rear clip arrangements being able to move and capable of being moved, against the action of at least one elastic return means, each moving clip arrangement being formed of a bow and mounted such that it can pivot relative to the pedal body; the elastic return means (Ea) of the moving clip arrangement (5*a*) runs transversely to the pedal spindle (2) and one of its ends collaborates with the moving clip arrangement (5*a*) of one face, its other end collaborating with the pedal body (1) equipped with the other clip arrangement (14*a*) of that same face of the pedal; the elastic return means of each face preferably consists of one or more flexing leaves (20*a*), particularly made of composite material.

11 Claims, 3 Drawing Sheets

SAFETY BICYCLE PEDAL, PARTICULARLY FOR MOUNTAIN BIKES

CROSS REFERENCE TO RELATED APPLICATIONS

This application claims priority under 35 U.S.C. §119(a) on Patent Application No. 0903419 filed in France on Jul. 10, 2009, the entire contents of which are hereby incorporated by reference.

The invention relates to a safety bicycle pedal, particularly for mountain bikes, of the type that comprises a body mounted such that it can rotate about a pedal spindle, and which has two faces with, on at least one of the two faces of the pedal:
  a front clip arrangement situated forward of the pedal spindle,
  and a rear clip arrangement situated to the rear of the pedal spindle,
  at least one of the front or rear clip arrangements being able to move and capable of being moved, against the action of at least one elastic return means, in a direction substantially orthogonal to the pedal spindle to move away from the other clip arrangement, a end stop means being provided on the body to hold the moving member in position against the action of the elastic return, the assembly being such that a cyclist wearing a shoe equipped, under the sole, with a cleat that mates with the pedal, can clip the cleat onto the pedal by applying pressure to the said pedal whereas he can release the sole from the pedal by a twisting movement of the foot,
  each moving clip arrangement being formed of a bow and being mounted such that it can pivot relative to the pedal body.

Pedals of this kind are known, particularly from FR 2 850 079 in the name of the same Applicant Company. These pedals are satisfactory and operate reliably, allowing rapid clipping in of the cleat secured under the sole of a shoe.

It is desirable to make it even easier to remove mud from and clean such pedals. It is also desirable to reduce the weight thereof.

A key objective of the invention is to provide a pedal of a very open design to make it easier to remove mud and to clean. The invention also aims to provide a pedal that is lightweight, with a reduced number of component parts.

According to the invention, a pedal of the aforementioned kind is characterized in that:
  elastic return of the moving clip arrangement of each of the faces is afforded by an elastic return means which runs transversely to the pedal spindle, and one end of which collaborates with the moving clip arrangement of one face and the other end collaborating with the body near the other clip arrangement of that same face of the pedal.

Advantageously, the elastic return means is formed of at least one flexing element of which the central zone and one of the ends presses in the pedal body. The flexing element may be formed of at least one flexing leaf, particularly made of composite material. The flexing leaf may be made using glass fibres or carbon fibres that are held together by a resin and directed at right angles to the pedal spindle. This leaf may be of rectangular shape, its long dimension running orthogonal to the pedal spindle.

Each moving clip arrangement is articulated by means of two elementary spindles borne on each side of the pedal body but spaced apart axially, and each elastic return means of a moving clip arrangement is situated outside of the space contained between the elementary spindles so that the central part of the clip arrangements of the pedal body is unobstructed.

The geometric axis of articulation of the clip arrangement is parallel to the pedal spindle.

The bow that makes up each moving clip arrangement is in the overall shape of an inverted U with two radially directed arms connected via a central cross-member that is substantially parallel to the pedal spindle. This cross-member may advantageously be made of metal and consist of a component attached to the clip arrangement.

A non-engagement boss able to prevent undesired catching of the front edge of a cleat on the rear bow at the time of clipping in is advantageously incorporated into the rear bow.

In order to limit the number of components, the non-moving bow, usually situated at the rear, benefits from being incorporated into the pedal body.

The moving bow may comprise, a blind housing on its radial arm on the outer side, a cylindrical pin, particularly one made of metal, to collaborate with the end of the elastic return means.

The flexing leaf presses, at least at one end, against this rotary cylindrical pin that has several flat faces at different radial distances from the geometric axis of the cylinder, it being possible by turning this pin to alter the preload of the flexing leaf.

To simplify the construction of the pedal, the flexing element of one face is subjected to flexing at three points situated alternately on one side of the leaf and then the other.

In addition to the provisions set out hereinabove, the invention consists in a certain number of other provisions that will be addressed more explicitly hereinafter in connection with an entirely nonlimiting exemplary embodiment described with reference to the attached drawings. In these drawings.

Figure 1:
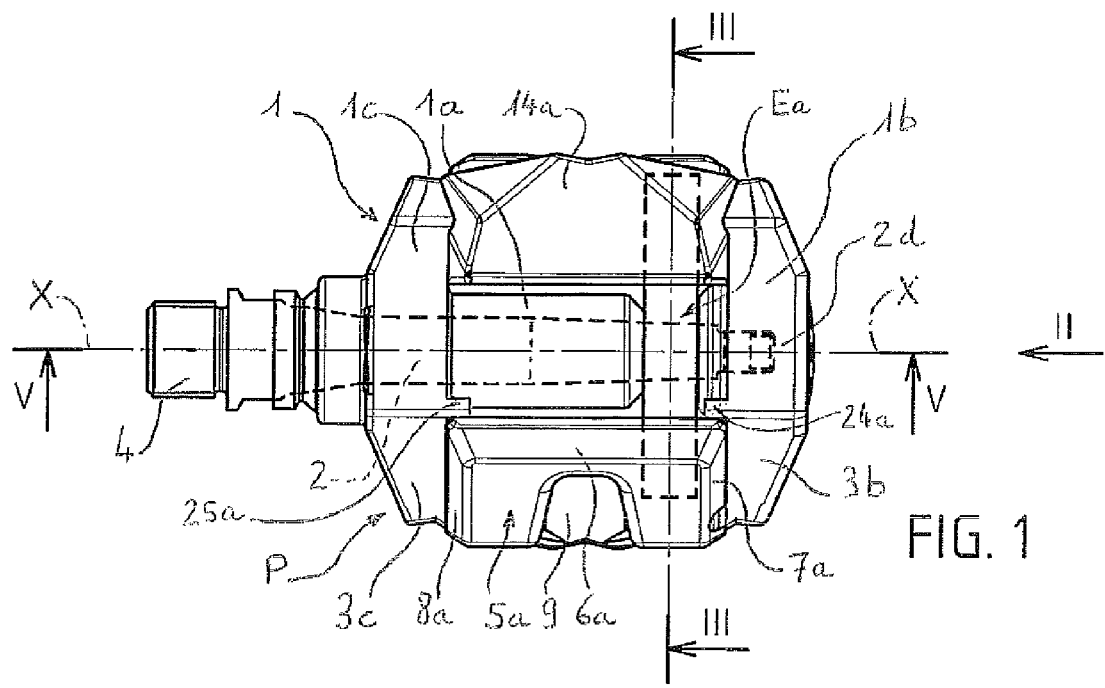
FIG. 1 is a view from above of a bicycle pedal according to the invention.
Figure 2:
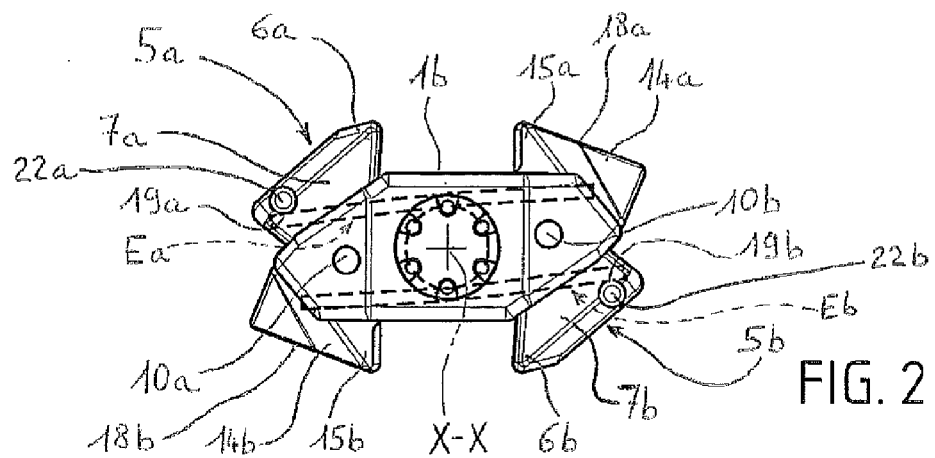
FIG. 2 is a view of the pedal in the direction of arrow II of FIG. 1.

Reference is made to the drawings, particularly to FIG. 1, which show a safety bicycle pedal P comprising a body 1 mounted such that it can rotate about a pedal spindle 2. The pedal body comprises a central barrel 1*a* comprising an internal housing to accept the spindle 2 and, at each axial end of the barrel, a part 1*b*, 1*c* forming a cage, extending radially on each side of the barrel 1*a*.

The pedal is preferably a double-sided pedal, that is to say that each face is identical, the pedal being symmetric with respect to its geometric axis of rotation X-X which corresponds to the geometric axis of the spindle 2. The pedal depicted in the drawings is a left-hand pedal. The right-hand pedal is its symmetrical counterpart taking a plane orthogonal to the geometric axis of rotation as the plane of symmetry.

Figure 5:
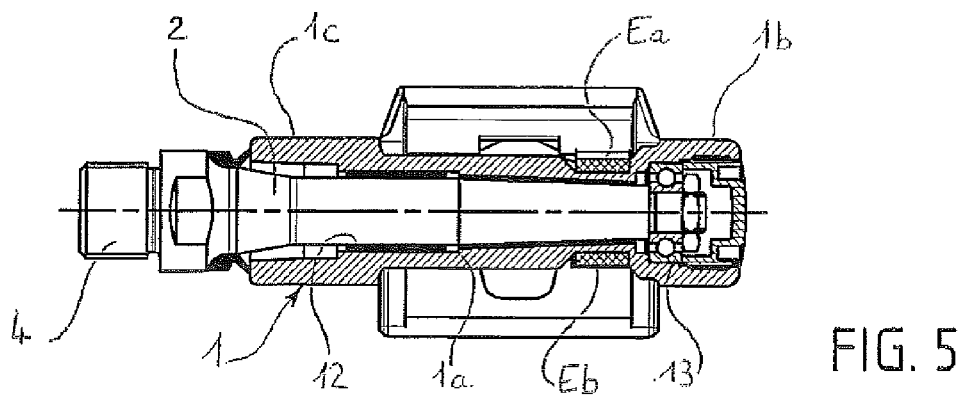
FIG. 5 is a simplified vertical section on V-V of FIG. 1.

The end parts of the pedal body 1 are bounded, at the front, by a forwardly inclined wall 3*b*, 3*c* that is at a pronounced slope in relation to the mid-plane of the pedal. The mid-plane passes through the geometric axis of rotation and is parallel to and equidistant from the upper and lower faces of the parts 1b, is of the pedal body. The angle made between the inclined wall 3b, 3c and the mid-plane may be of the order of 20° to 40°. The spindle 2 projects from the barrel 1a at one end 4 which comprises a screw thread allowing the spindle 2 to be screwed into the end of a crank, not depicted. On the one hand, the spindle 2, near its centre, passes through a sliding-contact bearing bushing or alternatively a needle rolling bearing 12 push-fitted into a bore of the body created along the axis X-X and, on the other hand, this spindle 2 is secured to a ball rolling bearing 13 push-fitted onto its distal end 2d (FIG. 5).

Because the two faces of the pedal are symmetric with respect to the geometric axis of rotation of the pedal, the description of elements of one face will immediately explain the elements of the other face if the b following the same reference numerals or figures is substituted for the letter a.

The pedal comprises, on its upper face, in the depiction given in the drawings, a front clip arrangement formed of a bow 5a substantially in the shape of an inverted U pivot-mounted relative to the body 1 of the pedal. This bow 5a comprises a central cross-member 6a, parallel to the pedal spindle 2, and two radial arms 7a, 8a which are substantially orthogonal to the geometric axis of the pedal and comprised between the internal faces of the parts 1b, 1c of the body 1. The arms 7a, 8a flank an opening 9. The same is true of the arms 7b, 8b.

Figure 7:
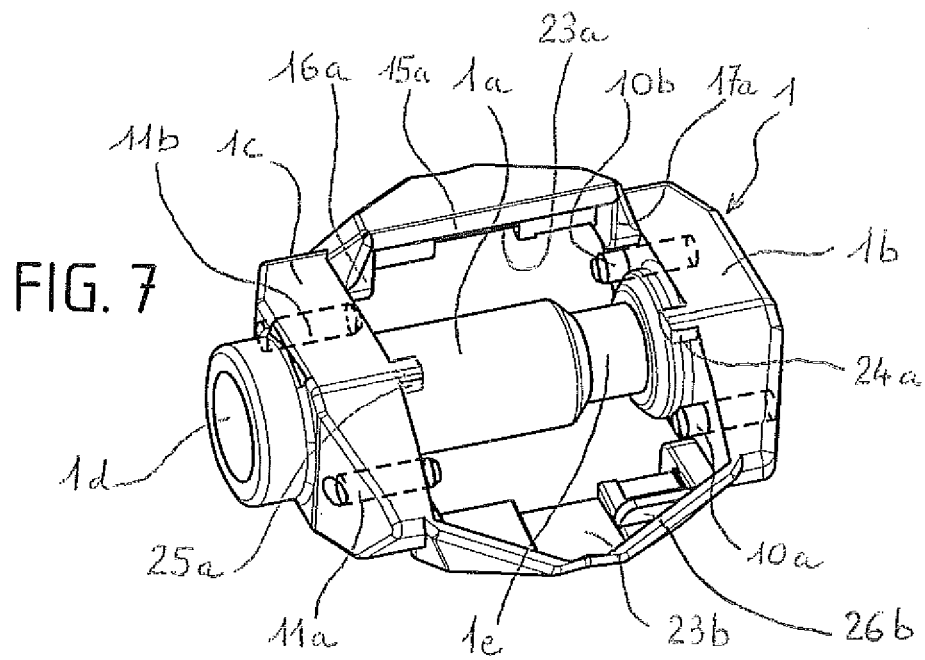
FIG. 7 is a perspective view of the pedal body equipped with the two pairs of spindles about which the two symmetric moving bows rotate, but viewed from a different angle.
Figure 8:
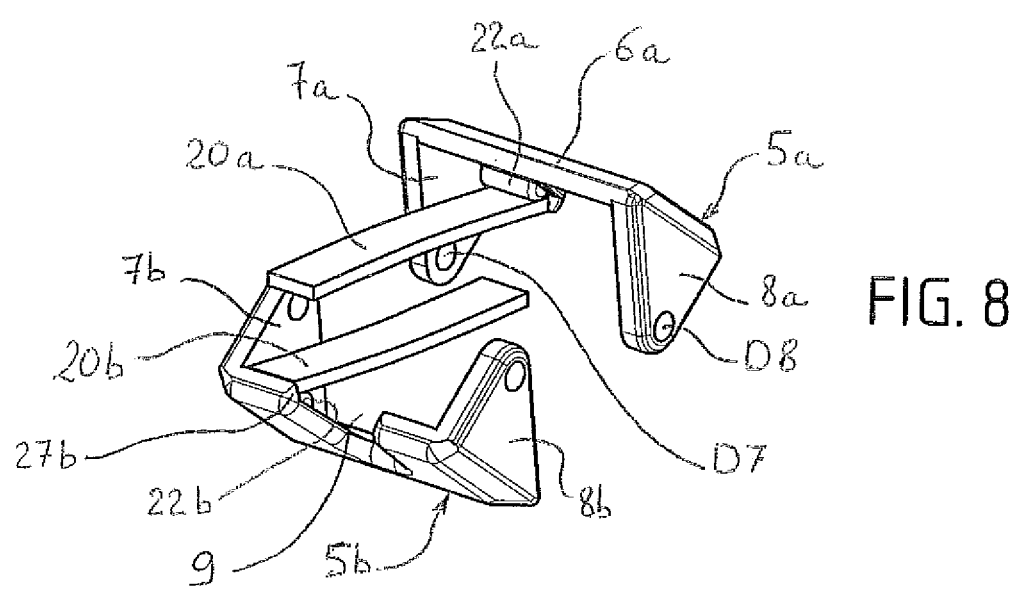
FIG. 8 is a perspective view of the two moving bows each equipped with a pressing pin and with the flexing leaf.

The bow 5a is articulated on the body 1 using two elementary spindles 10a, 11a (FIG. 7) which are aligned, but axially separated so that the central part of the pedal corresponding to the opening 9 of the bow 5a remains unobstructed. The spindles 10a, 11a are supported by bearings provided at the front of the parts 1b, 1c and project inward enough to engage in other bearings D7, D8 (FIG. 8) provided in the arms 7a, 8a of the bow 5a, without protruding into the opening 9. The spindles 10a, 11a are situated below the mid-plane of the pedal that passes through the geometric axis of rotation thereof.

On its upper face, the pedal comprises a rear clip arrangement likewise consisting of a bow 14a in the form of an inverted U comprising a cross-member 15a parallel to the pedal spindle and two radial arms 16a, 17a (FIG. 7) directed toward the mid-plane of the pedal.

This bow 14a is advantageously built into the pedal body 1 and forms one piece therewith. Further, the radial arms 16a and 17a may be joined together by an inclined surface 18a thus forming a boss. When this shoe is being clipped in, this inclined surface is able to encourage the front part of the cleat C attached under the sole S of the shoe to slide (FIG. 4) and avoid undesired catching of the front edge of the cleat on the rear support bar 15a.

The lower face of the pedal comprises elements similar to those described previously and denoted by the same reference numerals followed by the letter b instead of the letter a, these being symmetric with respect to the geometric axis of rotation of the pedal.

Each bow is thus pivot-mounted with respect to the pedal body about the elementary spindles 10a, 11a in the case of the bow 5a and about the elementary spindles 10b, 11b in the case of the bow 5b.

When the lower face of the pedal, according to the illustration in the drawings, becomes the upper face because the pedal has rotated through 180° about its axis, a similar configuration is found. The elementary articulation spindles 10b-11b find themselves vertically offset downward with respect to the horizontal mid-plane of the pedal.

Figure 4:
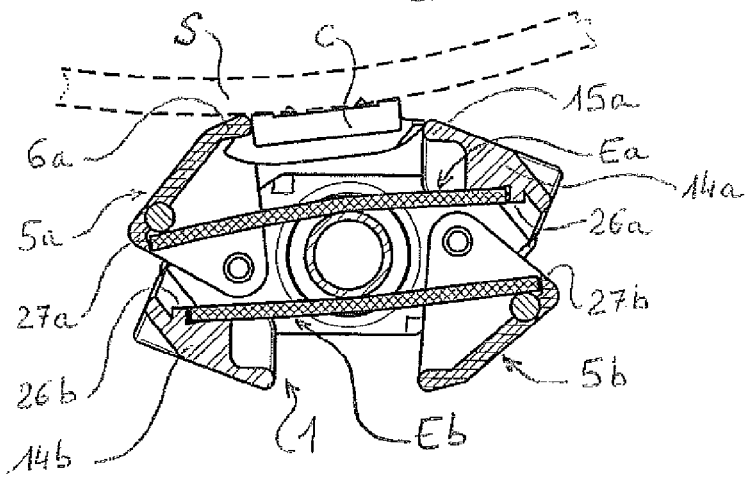
FIG. 4 shows, in a similar way to FIG. 3, the pedal with the front moving clip arrangement pivoted.
Figure 6:
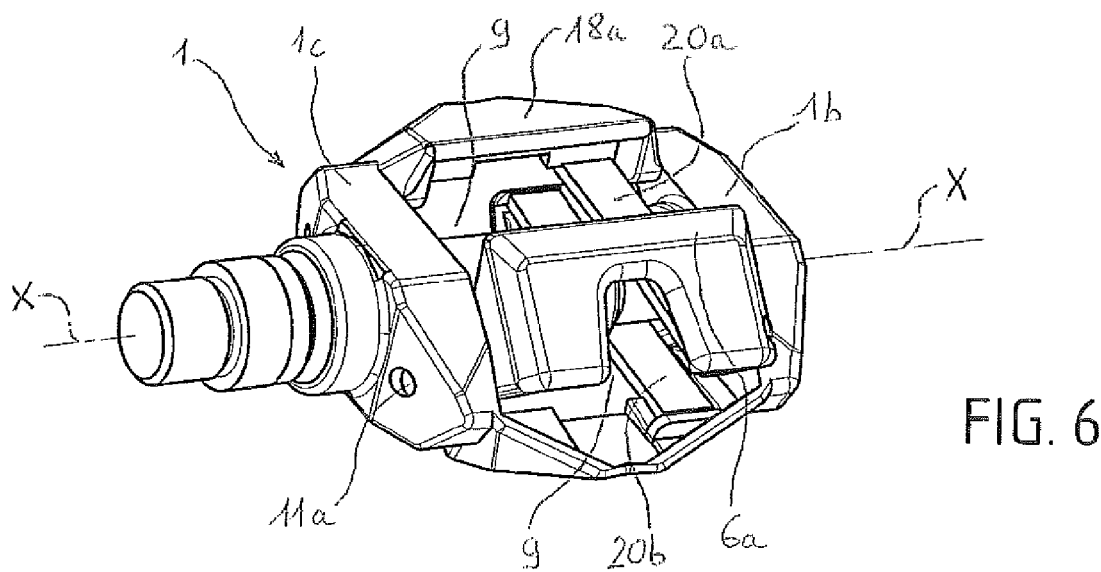
FIG. 6 is a perspective view of the pedal from above and front right.

The front clip arrangement consisting of the bow 5a is able to move and can be moved against the action of an elastic return means Ea, in a direction substantially orthogonal to the pedal spindle in order to move away from the other clip arrangement 14a, as illustrated in FIG. 4.

In order to ensure an appropriate separation between the front cross-member 6a and the rear cross-member 15a, there is an end stop means (24a and 25a) on the body 1 to hold the moving arrangement in position against the effect of the elastic return Ea.

The assembly is such that a cyclist wearing a shoe equipped under its sole S (FIG. 4) with a cleat C that mates with the pedal can clip the cleat onto the pedal by applying pressure to the said pedal, whereas he can release the sole from the pedal by a twisting movement of his foot.

The or each elastic return means Ea, Eb runs transversely to the pedal spindle 2, to the moving clip bow 5a of one face, and to the fixed clip bow 14a of that same face.

According to one particularly advantageous embodiment, the elastic return means Ea consists of a flexing element, preferably a flexing leaf 20a of rectangular shape, the long dimension of which runs substantially at right angles to the pedal spindle 2.

Figure 3:
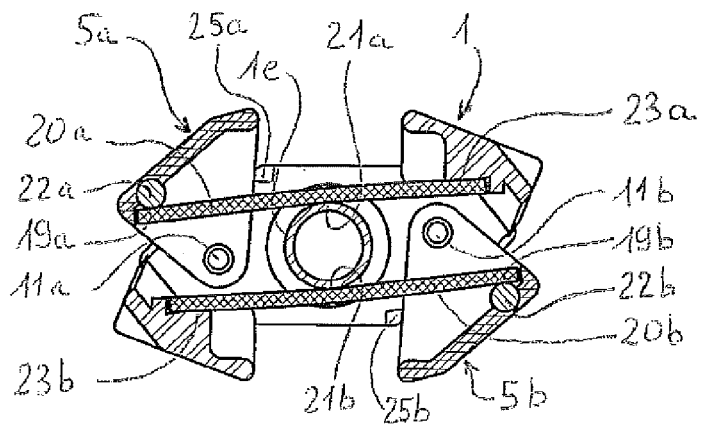
FIG. 3 is a schematic section, on III-III of FIG. 1, of the pedal with the moving clip arrangements in their position of rest.

The point of action 19a of the flexing leaf on the bow 5a is situated above the geometric axis of articulation 10a-11a and the flexing leaf applies to the point 19a a thrust which has a tendency to cause the bow 5a to pivot in a direction that moves it closer to the body 1, namely in the clockwise direction about the geometric axis 10a-11a according to FIG. 3. This thrust is exerted upward according to FIG. 3, that is to say on the side away from the axis 10a-11a.

Although the leaf or plate 20a is a preferred embodiment, the flexing element could have some shape other than that of a leaf, for example consisting of a bar or of a rod.

The flexing leaf 20a is formed of one or more layers of material, particularly of composite material, and in particular is made up of glass fibres and/or carbon fibres joined together by a resin and directed at right angles to the pedal spindle. Several leaves may be superposed to form the means Ea.

A cylindrical metal pin 22a of axis parallel to that of the pedal, is anchored in the bow 5a in the region of the internal face of the arm 7a. The point of action 19a corresponds to the point of contact between the pin 22a and the leaf 20a.

The central barrel 1a has a zone of smaller diameter in the region of the flexing leaves 20a and 20b and that forms a kind of groove 1e. The flexing leaf 20a presses against the groove 1e (FIG. 7) at the points of contact 21a and 21b. According to FIG. 3, the leaf 20a passes over the groove 1e and the symmetric leaf 20b passes under the groove 1e. This arrangement allows the flexing leaves 20a and 20b to be fitted closer to the spindle 2 and therefore allows the pedal to be made very compact.

The upper end of the leaf 20a which is at the opposite end to the point of contact 19a presses against the body in the region 23a situated generally under the cross-member 15a.

Thus, the leaf 20a is immobilized in the pedal body 1 without being jammed therein, between the pressing points 21a and 23a. Friction between contacting surfaces holds the leaf 20a in place and it operates in flexing on three points of contact: the first point of contact 19a is with the pin 22a anchored in the bow 5a, while the other two points of contact 21a and 23a are with the body 1.

End stops 26a and 27a positioned respectively on the body 1 and on the bow 5a make it possible to avoid the potential for excessive slipping of the flexing leaf 20a in the longitudinal direction. These end stops 26a and 27a are positioned in such a way that there is a small clearance between each end of the leaf 20a and the end stop near this end so that the flexing leaf 20a is not impeded in its elastic deformation.

An alternative form of embodiment is to combine the points of contact 21a and 23a and to build the flexing leaf 20a into the body 1 at its opposite end to the point of contact 19a.

The elastic return means Ea and Eb respectively consisting of the flexing leaves 20a and 20b collaborate with the outer arms of the moving bows 5a and 5b near the part 1b. The central opening 9 of the moving bows is entirely unobstructed.

The cleat C that is to be secured under the sole of the shoe, and associated with the pedal, is advantageously substantially rectangular or even square with front and rear lips delimiting a groove or slot for clipping in. A cleat of this type is described notably in FR 2 850 079 and EP 0 424 210.

The pins or cylinders 22a and 22b may be equipped, in their zone of contact with the flexing leaves 20a and 20b respectively, with several eccentric flat parts that allow the preload of the leaves 20a and 20b to be adjusted by adjusting the angular position of the pins 22a and 22b about their geometric axis.

When the moving bows 5a and 5b are made of lightweight material such as plastic for example, it is possible to conceive of protecting the cross-member 6a (and 6b respectively) with a metal coating, or for the bow 5a (5b) to be metalloplastic, that is to say for the cross-member 6a (6b) to be made of metal and for the arms 7a (7b) and 8a (8b) of the bow 5a (5b) to be made of a plastic overmoulded on the said cross-member 6a (6b).

Likewise, at the rear, if the material of the body has low wear resistance, then in order for the cross-members 15a and 15b thereof to have sufficient life in their part in contact with the catching parts of the cleat C, the cross-members 15a and 15b may be made of metal and attached to the body made of aluminium or of composite.

In order to clip the cleat C to the pedal, the cyclist engages the front lip of the cleat under the cross-member 6a of the moving front bow and applies pressure to the pedal causing the bow to pivot forward in the anticlockwise direction as illustrated in FIG. 4, against the action of the elastic return applied by the leaf 20a.

The rear part of the cleat C can then be lowered and clipped by the rear cross-member 15a, after which the front bow is returned to the clipping position by the leaf 20a.

The pedal according to the invention is lightweight because of a reduced number of parts, particularly thanks to the elastic return system which may be made of composite material. The reduction in the number of metal component parts also plays a part in reducing the weight.

The pedal is of a very open design because of the absence of parts or material in the central part of the pedal consisting of the opening 9 of each bow, making the removal of mud from and cleaning of the pedal easier.

The description has been given in connection with the moving front clip arrangement, but it is possible to conceive of a moving rear clip arrangement, in which case the front clip arrangement could be fixed or even moving.

The invention claimed is:

1. A safety bicycle pedal, particularly for mountain bikes, comprising a body mounted such that it can rotate about a pedal spindle, and which has two faces with, on at least one of the two faces of the pedal:
   a front clip arrangement situated forward of the pedal spindle,
   and a rear clip arrangement situated to the rear of the pedal spindle,
   at least one of the front clip arrangement or the rear clip arrangement being able to move and capable of being moved, against an action of at least one elastic return means, in a direction substantially orthogonal to the pedal spindle to move away from the other of the front clip arrangement or the rear clip arrangement, limiting stop means being provided on the body to hold one of the at least one moving clip arrangements in position against the action of the elastic return, the assembly being such that a shoe equipped, under a sole, with a cleat that mates with the pedal, can have the cleat clipped onto the pedal by applying pressure to-the said pedal whereas the shoe can be released from the pedal by a twisting movement of the shoe, each moving clip arrangement being pivot-mounted in relation to the pedal body, wherein the pedal body comprises a central barrel having an internal housing to accept the pedal spindle,
   the elastic return means (Ea) of each moving clip arrangement (Sa) is formed of at least one flexing element which runs transversely to the pedal spindle and on at least one face of the pedal, wherein each flexing element presses against the central barrel, outside the internal housing,
   one end of the at least one flexing element collaborates with one of the at least one moving clip arrangements on one face of the pedal,
   and the other of the at least one flexing element end collaborates with the pedal body equipped with the other of the front clip arrangement or the rear clip arrangement of that same face of the pedal,
   wherein a central zone of the flexing element presses against the pedal body,
   a first end stop and a second end stop positioned respectively on the body and on the bow, each of the first and second end stops positioned to limit longitudinal slipping of the flexing element, and each of the first and second end stops being positioned with a clearance between respective ends of the flexing element so as to not impede elastic deformation of the flexing element,
   wherein the flexing element is subjected to flexing at three points,
      the first point being a zone of contact between the upper end of the flexing element and the moving clip arrangement, said first point being farther from the central barrel than an articulation axis of the moving clip arrangement,
      the second point being a zone of contact between a central lower part of the flexing element and a central zone of the body,
      the third point being a zone of contact between the other upper end of the flexing element and that part of the body that lies under the other clip arrangement.

2. The pedal according to claim 1, wherein each flexing element is formed of at least one flexing leaf, particularly made of composite material.

3. The pedal according to any one of the preceding claims, wherein the end of the flexing element which is at the opposite end to the moving clip arrangement presses against the pedal body.

4. The pedal according to claim 2, wherein the flexing leaf is made using glass fibres or carbon fibres that are held together by a resin and directed at right angles to the pedal spindle.

5. The pedal according to claim 1, wherein each of the two faces is equipped with clip arrangements, wherein the pedal body in a central zone has a slot or groove (le) against which the flexing elements (Ea and Eb) symmetrically press.

6. The pedal according to claim 1, wherein each moving clip arrangement includes a bow in the overall shape of an inverted U with two radially directed arms connected via a central cross-member that is substantially parallel to the pedal spindle.

7. The pedal according to claim 6, wherein the geometric pivot axis of the clip arrangement is parallel to the pedal spindle.

8. The pedal according to claim 6, wherein a non-engagement boss able to prevent undesired catching of a front edge of a cleat on a rear bow at the time of clipping in is incorporated into the rear bow.

9. The pedal according to claim 1, wherein the moving bow includes a blind housing on a radial arm on an outer side, and comprises a cylindrical pin disposed in the blind housing to collaborate with the one end of the elastic return means.

10. The pedal according to claim 1, wherein the elastic return means (Ea) is formed of at least one flexing element which is built into a body of the elastic return means at one end thereof that is opposite another end that collaborates with the moving clip arrangement.

11. A safety bicycle pedal, particularly for mountain bikes, comprising a body mounted such that it can rotate about a pedal spindle, and which has two faces with, on at least one of the two faces of the pedal:
- a front clip arrangement situated forward of the pedal spindle,
- and a rear clip arrangement situated to the rear of the pedal spindle,
- at least one of the front clip arrangement or the rear clip arrangement being able to move and capable of being moved, against an action of at least one elastic return means, in a direction substantially orthogonal to the pedal spindle to move away from the other of the front clip arrangement or the rear clip arrangement, an end stop means being provided on the body to hold one of the at least one moving clip arrangements in position against the action of the elastic return, the assembly being such that a shoe equipped, under a sole, with a cleat that mates with the pedal, can have the cleat clipped onto the pedal by applying pressure to-the said pedal whereas the shoe can be released from the pedal by a twisting movement of the shoe, each moving clip arrangement being pivot-mounted in relation to the pedal body, wherein the pedal body comprises a central barrel having an internal housing to accept the pedal spindle, the elastic return means (Ea) of each moving clip arrangement (Sa) is formed of at least one flexing element which runs transversely to the pedal spindle and on at least one face of the pedal, wherein each flexing element presses against the central barrel, outside the internal housing, one end of the at least one flexing element collaborates with one of the at least one moving clip arrangements on one face of the pedal, and the other of the at least one flexing element end collaborates with the pedal body equipped with the other of the front clip arrangement or the rear clip arrangement of that same face of the pedal, wherein a central zone of the flexing element presses against the pedal body, and wherein each moving clip arrangement is articulated by two elementary spindles borne on the pedal body but spaced apart axially, each elastic return means (Ea, Eb) of each moving clip arrangement being situated outside of the space aligned with and contained between the elementary spindles so that a central part of the clip arrangements of the pedal body is unobstructed.

* * * * *